(12) United States Patent
Thibodeau et al.

(10) Patent No.: US 7,636,307 B2
(45) Date of Patent: Dec. 22, 2009

(54) RANDOM EARLY PACKET DISCARD (RED)

(75) Inventors: Mark Thibodeau, Nepean (CA); Bin Du, Ottawa (CA)

(73) Assignee: Alcatel Lucent, Paris (FR)

( * ) Notice: Subject to any disclaimer, the term of this patent is extended or adjusted under 35 U.S.C. 154(b) by 1244 days.

(21) Appl. No.: 10/386,651

(22) Filed: Mar. 13, 2003

(65) Prior Publication Data
US 2004/0179473 A1 Sep. 16, 2004

(51) Int. Cl.
H04L 12/56 (2006.01)
(52) U.S. Cl. ............... 370/230.1; 370/231; 370/235; 370/412; 370/428
(58) Field of Classification Search .......... 370/229, 370/230, 230.1, 231, 235, 252, 412–418, 370/428; 709/223–225
See application file for complete search history.

(56) References Cited

U.S. PATENT DOCUMENTS

| | | | |
|---|---|---|---|
| 6,252,848 B1 | 6/2001 | Skirmont | 370/229 |
| 6,463,068 B1 * | 10/2002 | Lin et al. | 370/414 |
| 6,560,198 B1 * | 5/2003 | Ott et al. | 370/235 |
| 6,829,224 B1 * | 12/2004 | Goldman et al. | 370/252 |
| 6,912,226 B2 * | 6/2005 | De Cnodder et al. | 370/412 |
| 7,035,216 B2 * | 4/2006 | Kikuchi et al. | 370/235 |
| 7,142,507 B1 * | 11/2006 | Kurimoto et al. | 370/229 |
| 7,206,284 B2 * | 4/2007 | Bellows | 370/230.1 |
| 7,280,477 B2 * | 10/2007 | Jeffries et al. | 370/235 |
| 7,286,485 B1 * | 10/2007 | Ouellette et al. | 370/252 |
| 2002/0159388 A1 | 10/2002 | Kikuchi et al. | 370/229 |

FOREIGN PATENT DOCUMENTS

EP 1 211 854 A2 5/2002

OTHER PUBLICATIONS

U.S. Appl. No. 10/386,652, Thibodeau et al, filed Mar. 13, 2003.*

Olesinski et al: "Probability and Average Occupancy Calculations in RED Algorithm", Proceedings of 2003 IEEE 18th Annual Workshop on Computer Communications, Oct. 20, 2003, pp. 148-153, XP010662908.

Makkar et al; "Empirical Study of Buffer Management Scheme for Diffserv Assured Forwarding PHB", Commputer Communications and Networks. 2000. Proceedings. Ninth International Conference on Las Vegas, NV, USA Oct. 16-18, 2000, Piscataway, NJ, USA, IEEE, US, Oct. 16, 2000 pp. 632-637, XPO10524573.

Floyd et al: "Random Early Detection Gateways for Congestion Avoidance", IEEE/ACM Transactions on Networking, IEEE Inc., New York US, vol. 1, No. 4, Aug. 1, 1993. pp. 397-413 XP000415363.

* cited by examiner

Primary Examiner—Michael J Moore, Jr.
Assistant Examiner—Duc T Duong
(74) Attorney, Agent, or Firm—Kramer & Amado, P.C.

(57) ABSTRACT

At telecommunications switches and routers, RED (random early packet discard) uses the queue depth to determine whether to keep or discard each packet as it arrives at a queue. This is done by determining a discard probability (P), which is dependent on the average depth of the queue, and comparing the discard probability to a random number. One way of performing the invention uses the summed discard probabilities, instead of counting the number of packets (count) and multiplying that by the current discard probability, as in the prior art. The resulting sum is compared to the random number for discard operation. The disclosure further describes a more accurate way of calculating average depth of a queue, especially when the queue encounters periods of idleness.

13 Claims, 7 Drawing Sheets

RANDOM EARLY PACKET DISCARD (RED)

FIELD OF INVENTION

The invention resides in the field of congestion control in a communications switch or router. More particularly, the invention is directed to the problem of alleviating traffic congestion by selectively discarding packets of telecommunications traffic, based on the condition of a queue.

BACKGROUND OF INVENTION

FIG. 1 shows a simplified architecture of a communications switch 10 or a router. Packets 12 of traffic arrive at ingress queues and are switched by a switching fabric to egress queues before departing from an output port 14 of the switch. When the depth of packets in any queue exceeds a discard threshold (Dt) 16, packets arriving at that queue may be dropped in accordance with a tail drop procedure. That is, packets at the end of the queue are dropped until the queue depth (also called the queue occupancy) recedes below the discard threshold. A problem with this procedure, in the case of TCP connections, is that packets can be dropped from a single TCP connection because of the nature of the protocol.

Another type of discard procedure, which alleviates the aforementioned problem with TCP connections, is random early packet discard (RED for short). RED uses the queue depth (queue occupancy) to determine whether to keep or discard each packet as it arrives at the queue. This is done by determining a discard probability, which is dependent on the average depth of the queue (also called average queue depth or average queue occupancy), and comparing the discard probability to a random number. If the discard probability is greater than the random number the packet is discarded.

FIG. 2 shows a graph of an example discard probability function versus average queue depth. According to this function, the discard probability is zero until a minimum-threshold is reached, thereafter the discard probability increases linearly until a maximum threshold is reached. For average queue depths greater than the maximum threshold the discard probability is 100%.

FIG. 3 shows graphs of discard probability functions for a variation of RED, known as, weighted RED. In this case, there are three discard probability functions (green, yellow, and red) and each will result in a different discard probability for the same average queue depth. The particular discard probability function that is used for a packet depends on the drop precedence (colour) of the packet. The drop precedence (DP) is determined by examining the DiffServ Code Point (DSCP) field in the IP header of the packet. Packets that exceed agreements on their connections have their drop precedence (colour) changed by an IP policing procedure. As with the RED procedure, in weighted RED the determination to keep or discard a packet is made by comparing the discard probability of the packet to a random number, discarding the packet when the probability exceeds the number. Variations of this procedure include having more discard probability functions, and having different probability curves in accordance with a class of service (CoS) to which the packet belongs. The CoS of a packet is also determined by examining the DSCP field in the IP header.

FIG. 4 shows another example of weighted RED with the discard probability functions having shapes that are generally accepted to work well. The figure includes three graphs for three colours. For each colour, its function provides the discard probability that increases linearly from 0% to MAXp, as the average queue depth increases from its minimum threshold (MINth) to its maximum threshold (MAXth). Above MAXth, the discard probability is 100%. Different vendors and different drop precedence (colour) functions will have different values for MAXp, MINth, and MAXth shown in the figure. In the figure, MAXp, which is less than 100%, is same for all the colours. Discard probability functions having different shapes and curves are possible.

It is therefore summarized that whether a packet arriving to the RED system is queued or dropped depends on the current discard probability and the colour (relative priority) of the packet. Discard probability, in turn, depends on the average queue depth. These relations can be formalized as follows.

$$\text{New } N_{avg} = \text{Previous } N_{avg} + W \times (N_{cur} - \text{Previous } N_{avg}) \quad (1)$$

$$P(\text{colour}) = F_{colour}(\text{New } N_{avg}) \quad (2)$$

$N_{avg}$ is the average queue depth, and $0<W<1$ is a moving average weight that determines how closely the average follows the actual (current) queue depth, $N_{cur}$. If W is small, the average will lag behind the actual queue depth; conversely, the average will follow closely the actual queue depth when W is large. P is a discard probability, different for every colour of a packet (colour∈{red, yellow, green}), and $F(N_{avg})$ is a linear discard probability function that returns values that depend on the colour and the average queue depth. FIGS. 2-4 give some example functions.

As previously mentioned, the determination of whether to discard or keep a packet is made by comparing the discard probability of the packet to a random number (RN). There are two common methods for selecting and comparing a random number, or random variable, to the discard probability. These methods are the geometric random variable (GRV) method and the uniform random variable (URV) method.

FIGS. 5 and 6 show a comparison of the results of the GRV and URV methods with a constant average queue depth. FIG. 5 is the GRV method and FIG. 6 is the URV method. In the figures the horizontal lines depict time and the small vertical lines depict packet discards. According to the geometric random variable (GRV) method, a new random number is selected for each packet arriving at a queue. If the discard probability for the packet exceeds the random number then the packet is discarded. As FIG. 5 shows, the resulting discards are randomly distributed in time. The URV method, on the other hand, selects a new random number only after a packet has been discarded. The URV method, therefore, counts the number of packets (count) since the last discard and multiplies the count by the discard probability. If the resulting product is greater than the random number then the packet is discarded, the count set to zero, and a new random number is generated. Otherwise the packet is accepted and the count is incremented.

URV Algorithm:

```
Initialize packet count=0;
IF (packet count*P(colour))>RN), THEN
{
discard the packet;
get a new RN;
packet count=0;
}
Else
{
accept the packet;
increment packet count (i.e., packet count=packet count+1)
}
```

It has been shown that URV method gives a better performance than GRV method because it usually achieves a more uniform distribution of packet discards over time, as seen in FIG. 6. This is desirable because if too many packets are discarded consecutively and/or intervals between accepted packets are long, a global synchronization with several connections may occur, resulting in reduction of their windows at the same time.

Although the URV method provides the desirable result of uniformly distributing packet discards in time, it requires an additional multiply operation over the GRV method. This extra multiplication takes a significant amount of processing time. As an example, assume that a typical network processor has 56 cycles to process a 40-byte packet at 9.14 Gb/s (equivalent to OC-192) rate. Each multiplication operation takes 6 cycles to complete. This yields a total of 12 cycles for the multiplication part of the discard calculations. A problem with this approach is that, in the case of packets arriving at OC-192 rate, the URV discard procedure leaves only 44 cycles for the remainder of the discard processing, such as threshold checking. At these rates, every cycle is precious and saving them is important. The present invention provides novel ways to perform RED more efficiently, requiring less processing power and/or time, making it more suitable for high-speed applications.

Furthermore, to perform the RED algorithm, discard probability, P(colour), which depends on average queue depth, $N_{avg}$, must be calculated by using formulae (1) and (2). There are several ways of calculating formulae (1) and (2). Two common variations are described here, i.e., "background method" and "arrival method". In the first method, a background process is invoked every T seconds. This process calculates average queue depth and discard probability using formulae (1) and (2) respectively. The obtained values are then used to determine a fate of every packet that arrives to the system during the next T seconds. After that time, the background process is called again, the current queue depth is fetched, and new average queue depth and discard probability are computed. In the second method, on the other hand, average queue depth and discard probability are not calculated periodically but every time a packet arrives to the system. Again, formulae (1) and (2) above are used for the calculations and the packet is either accepted or discarded based on the calculated value of discard probability. Whichever method is used, either URV or GRV procedure described above can be employed to perform accept/discard action.

When using "the arrival method", however, there may be an additional problem in calculating average queue depth after idle times, i.e., when the queue is empty. Referring to FIG. 7, which is a graph of actual (instantaneous) queue depth 70 compared to average queue depth 72. According to the procedure for calculating average queue depth when the queue is empty, the calculated average queue depth can incorrectly remain constant as shown by solid line 74 when in fact the correct average queue depth shown by dotted line 76 is decreasing.

This is explained as follows:

In known procedures of RED, when the queue goes empty, a timestamp is taken. When the next packet arrives, calculation of the average queue depth is made. When the queue is empty, formula (3) below, instead of formula (1) mentioned above, is used to calculate the average queue depth;

New $N_{avg}$=Previous $N_{avg}$×function(idle time, W)   (3)

The idle time is found by subtracting the current time from the queue empty timestamp. If the idle time is very small, the "function" given in formula (3) will be essentially equal to 1. If this occurs, the $N_{avg}$ does not change. Then the packet is transmitted, the queue goes empty, and a short time later another packet arrives. Again idle time is very small and $N_{avg}$ does not change. This can continue indefinitely. This error in the determination of the average queue depth, which could lead to needless discard of packets, is undesirable.

It is therefore apparent that improved techniques of discarding packets are desired. The techniques should require less processing power and/or time.

A further improvement in accuracy of calculating the average queue depth is also required for better performance of the random early packet discard operation.

SUMMARY OF INVENTION

The invention relates to the problem of alleviating traffic congestion in a communications switch or router. More particularly, the invention relates to a technique which requires less processing power and/or time.

In accordance with one aspect, the invention is directed to an improved technique of selectively discarding packets of traffic depending on the fill level, or depth, of queues in the communications switch.

In accordance with another aspect, the invention provides a method of obtaining discards uniformly distributed in time like the URV procedure but with less processing cycles, making it more suitable for OC-192 applications.

According to yet another aspect, the invention uses the summed discard probabilities, instead of counting the number of packets (count) and multiplying that by the current discard probability, as in the prior art. The resulting sum is compared to the random number for discard operation.

In accordance with yet another aspect, the invention provides a more accurate way of calculating average depth of a queue, especially when the queue encounters periods of idleness.

A further aspect of the invention therefore calls for a novel RED technique based on a more accurate average queue depth calculation, which results in improved packet discard operation with less processing power than required in the known techniques.

According to one specific aspect, the invention relates to a method of controlling a queue of a communications system. The method includes steps of deciding an accept/discard operation on a packet arriving at the queue, based on comparison between a discard probability sum for the packet and a random variable, calculating a discard probability for the packet, using an average depth of the queue, and generating a new discard probability sum for a next packet arriving at the queue, by summing the discard probability sum and the calculated discard probability.

In accordance with another aspect, the invention resides in the field of a random early packet discard procedure in a telecommunications system. The invention is directed to a method of calculating an average depth of a queue when a packet arrives at the queue. The method includes steps of measuring a current queue depth, $N_{cur}$, retaining a previous average queue depth, Previous $N_{avg}$, and monitoring whether or not the queue is empty. The method further includes a step of updating the average queue depth, New $N_{avg}$, by the following formulae;

if the queue is not empty,

New $N_{avg}$=Previous $N_{avg}$+W×($N_{cur}$−Previous $N_{avg}$);

if the queue is empty,

New $N_{avg}$=Previous $N_{avg}$×function(idle time, $W$), and if the queue is empty and also New $N_{avg}$=Previous $N_{avg}$, New $N_{avg}$=Previous $N_{avg}$+$W$×($N_{cur}$−Previous $N_{avg}$);

where W is a running weight between 0 and 1, and the function is a function that returns values based on the idle time of the queue and W.

According to another specific aspect, the invention is directed to a mechanism for controlling a queue of a communications system. The mechanism comprises a receiver for receiving and sending a packet to a queue for storage, and discard probability calculation module for calculating the discard probability sum which is the summation of discard probabilities of all packets that have arrived at the queue since a packet was last discarded from the queue. The mechanism further includes a random number generator for generating a random number when instructed, and discard module for discarding the just arrived packet from the queue if the discard probability sum is greater than the random number, and instructing the discard probability calculation module to set the discard probability sum to zero and to generate another random number to replace the aforementioned random number.

DETAILED DESCRIPTION OF EMBODIMENTS OF INVENTION

According to an embodiment of the invention, the discard probabilities are summed for each colour, instead of counting the number of packets (count) and multiplying that by the current discard probability P(colour), as in the prior art. The resulting sum (discard probability sum or $P_{sum}$(colour)) is compared to the random number (RN). If $P_{sum}$(colour) is greater than RN then the packet is discarded and $P_{sum}$(colour) is set to zero, otherwise the packet is accepted and the new discard probability P(colour) is added to $P_{sum}$(colour) (i.e., $P_{sum}$(colour)=$P_{sum}$(colour)+P(colour)). The result is packet discards for each colour that are uniformly distributed in time similar to the prior art URV method, but requires 50% less processing cycles to implement. This improvement in efficiency allows uniformly distributed packet discards to be achieved on OC-192 rate connections.

A new discard algorithm in accordance with one embodiment is therefore as follows:

```
Initialize=0
IF (P_sum(colour)>RN) then
{
discard packet;
P_sum(colour)=0;
get a new RN;
}
Else
{
accept packet;
P_sum(colour)=P_sum(colour)+P(colour)
}
```

Figure 8:
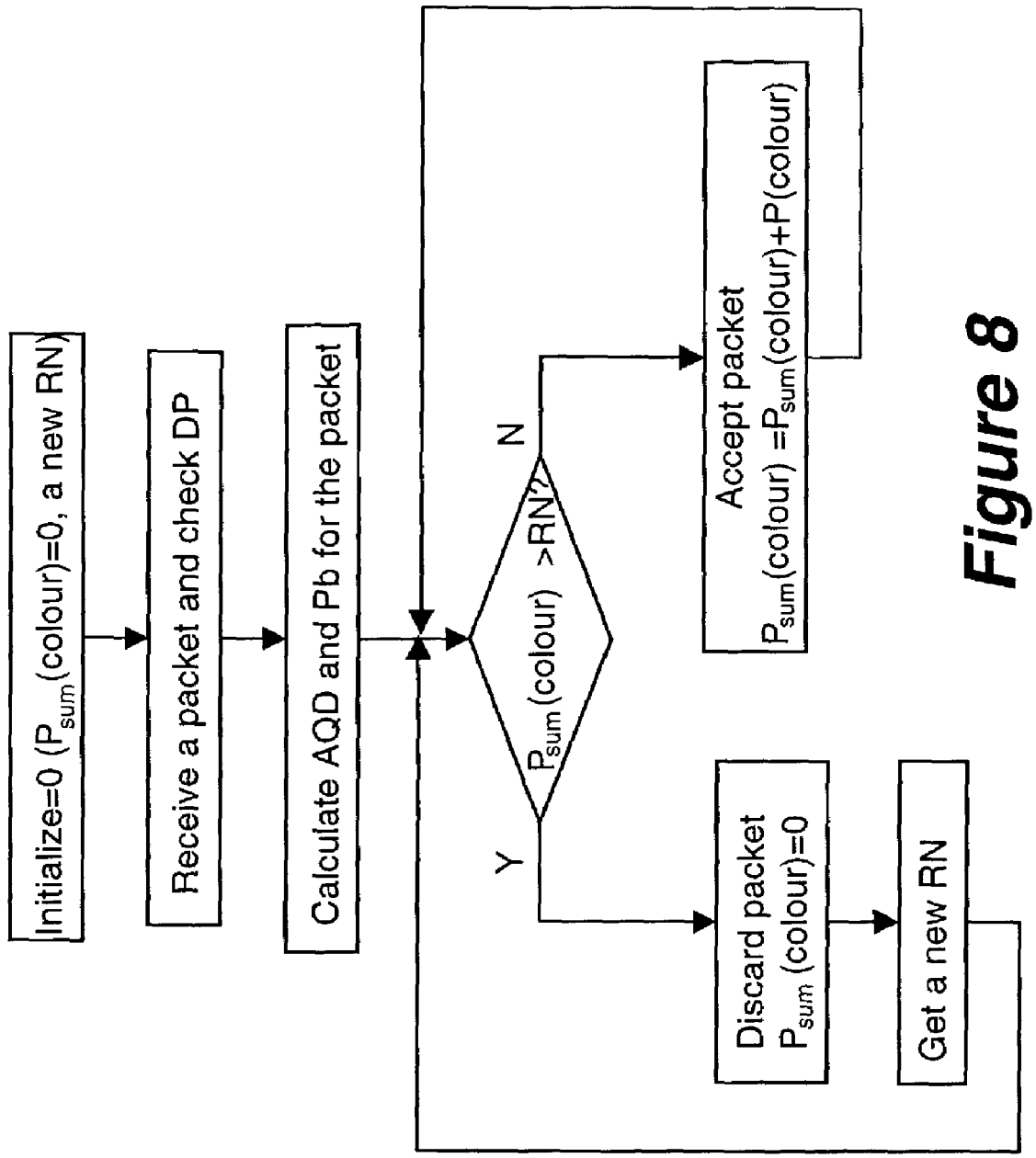
FIG. 8 is a flowchart of the algorithm in accordance with one embodiment of the invention.

FIG. 8 is a flowchart of the above algorithm.

Figure 9:
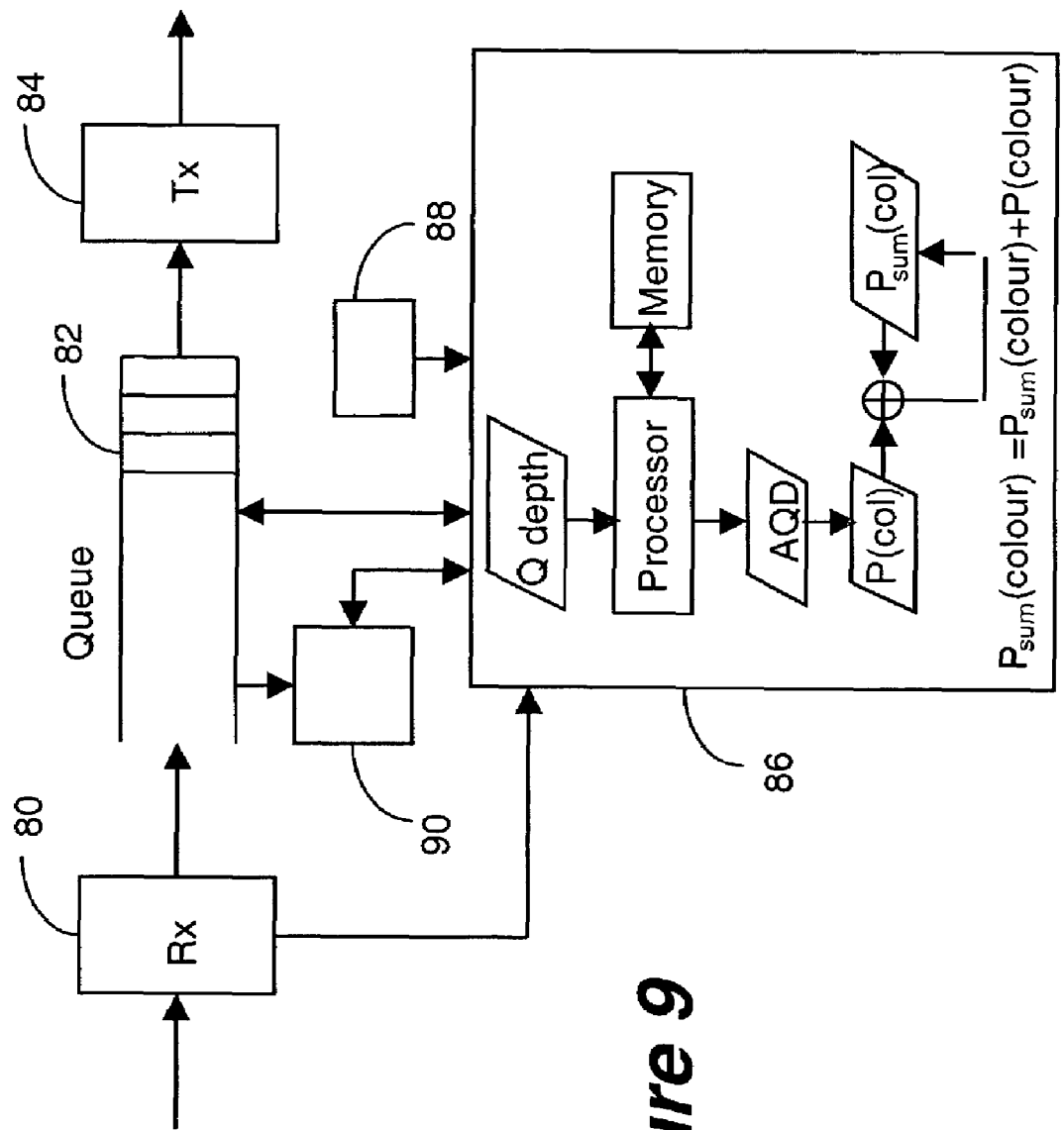
FIG. 9 is a schematic illustration of the discard mechanism according to one embodiment of the invention.

FIG. 9 is a schematic illustration of a discard mechanism according to the above-described embodiment of the invention. The figure only shows one queue associated with a variety of modules. It should be noted that a plurality of queues are in a switch or a router and they may share some or all modules. In the figure, a receiver 80 receives a packet and sends over to the queue 82 for storage from which a transmitter 84 transports a stored packet downstream. The receiver checks the drop precedence (colour) of the packet, if there are more than one level of precedence. A discard probability calculation module 86 continuously monitors the queue depth. It also calculates average queue depth and determines discard probability for the just arrived packet and the discard probability sum. The discard probability calculation module further makes a decision of accept/discard the packet in response to comparison between the discard probability sum for the colour of the packet and a random number obtained from random number generator 88. Discard module 90 drops off the packet from the tail of the queue when instructed by the discard probability-calculation module. The discard probability calculation module 86 includes a variety of elements such as processor, sum operator and a memory. The sum operator produces summation of the newly calculated discard probability P(colour) and previous $P_{sum}$(colour) (i.e., $P_{sum}$(colour)=$P_{sum}$(colour)+P(colour)) to produce a new $P_{sum}$(colour). This operation is more efficient than a multiplication operation of the prior art mechanism.

Figure 7:
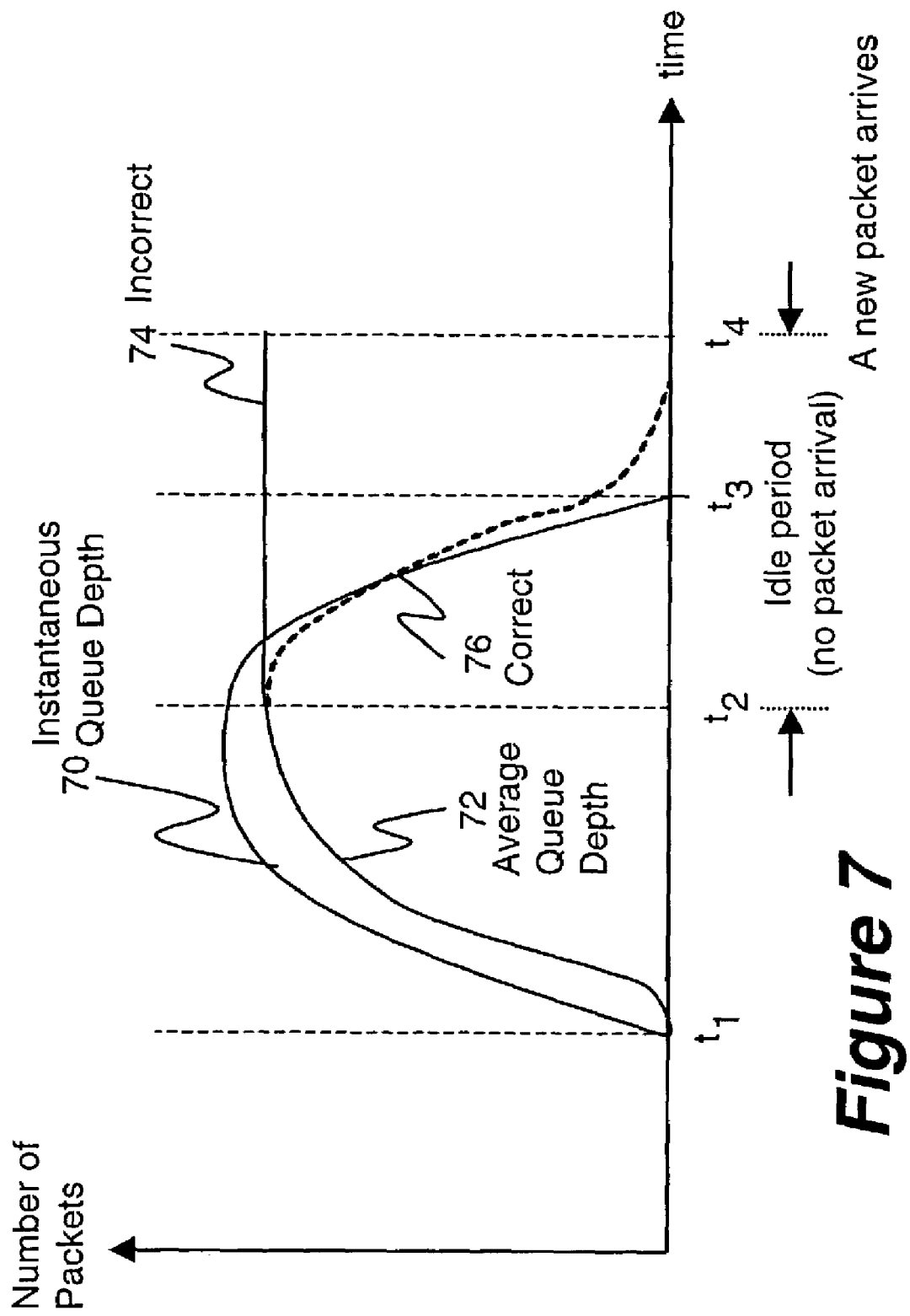
FIG. 7 are graphs of actual queue depth and average queue depth calculated by a known method, illustrating that improvements are needed.

The invention provides a further improvement in the "arrival method", resulting in a better accuracy of calculating the average queue depth ($N_{avg}$) of a queue when the queue encounters short idle periods. As previously mentioned by referring to FIG. 7, the prior art "arrival" method of making such calculations can lead to an incorrectly calculated average queue depth when an increasing queue depth is followed by short periods of queue emptiness. This will result in unnecessary discards in RED. The invention provides new ways of calculating average queue depth when the queue is empty to ensure a better performance of RED. Generally speaking, according to the invention, when the queue is empty and the new average equals the previous average, a formula for calculating average queue depth for a non-empty queue depth will be used.

In accordance with an embodiment of the invention, the average queue depth $N_{avg}$ when the queue is empty is calculated using two separate formulae. When the queue is empty, formula (3) above is used but when the queue is empty and also "New $N_{avg}$=Previous $N_{avg}$", then formula (1) is used.

In accordance with an embodiment, the invention uses the following logic:

```
IF (the queue is empty){
    use formula (3): New N_avg=Previous N_avg×function(idle time, W)
    IF (New N_avg==Previous N_avg){
        use formula (1):New N_avg=Previous N_avg+W×(N_cur-Previous N_avg)
    }
}
Else{
    use formula (1): New N_avg=Previous N_avg+W×(N_cur-Previous N_avg)
}
```

In accordance with an embodiment, in formula (1), weight W can take a form of $\frac{1}{2}^M$, where M is between 0 and 15.

Figure 1:
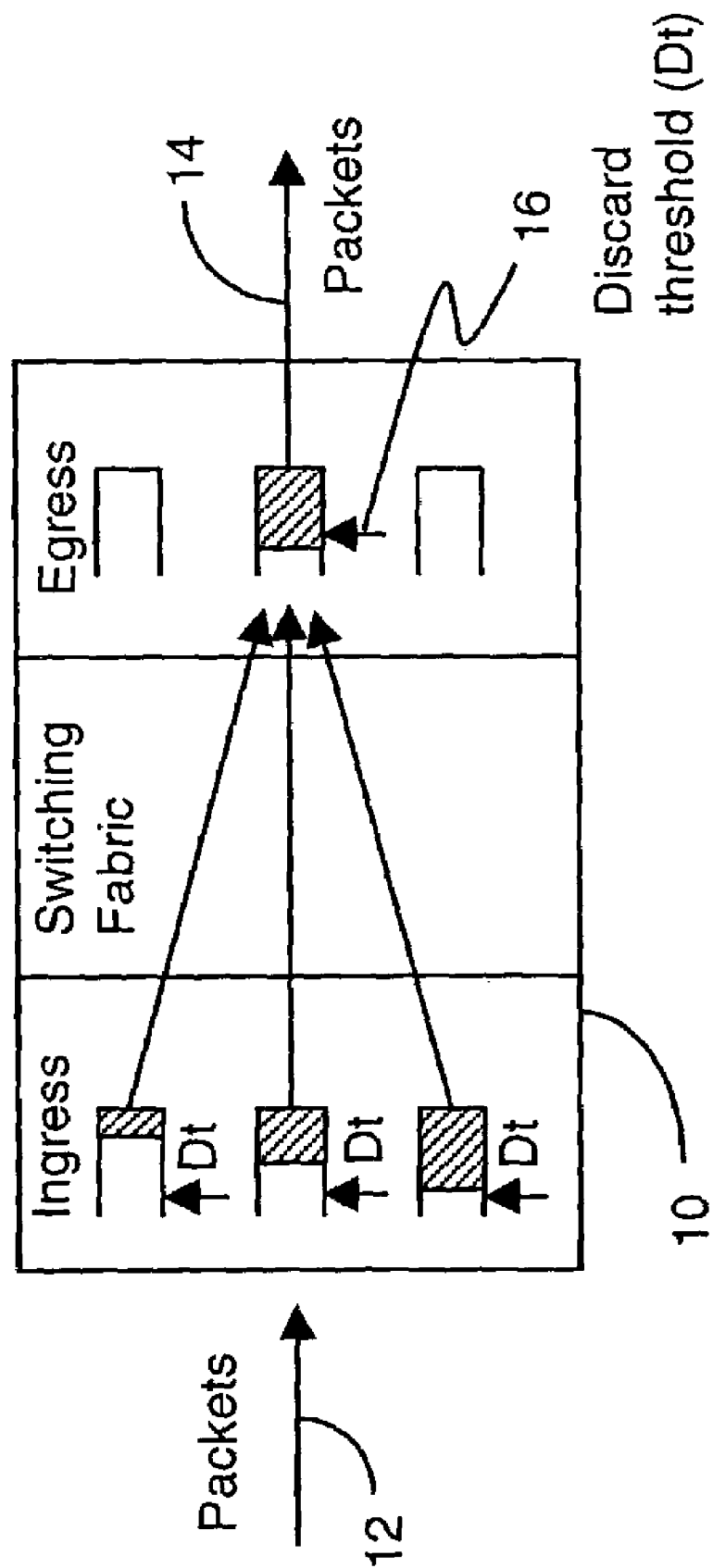
FIG. 1 is a schematic illustration of a packet switch or router.
Figure 2:
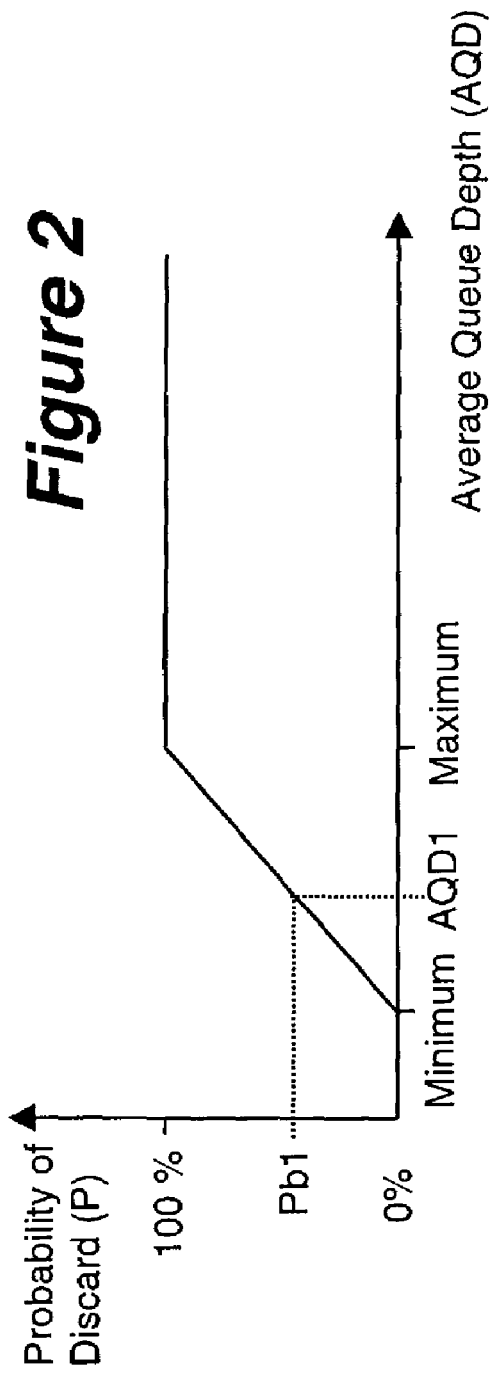
FIG. 2 is a graph of an example discard probability (Pb) function versus average queue depth.
Figure 3:
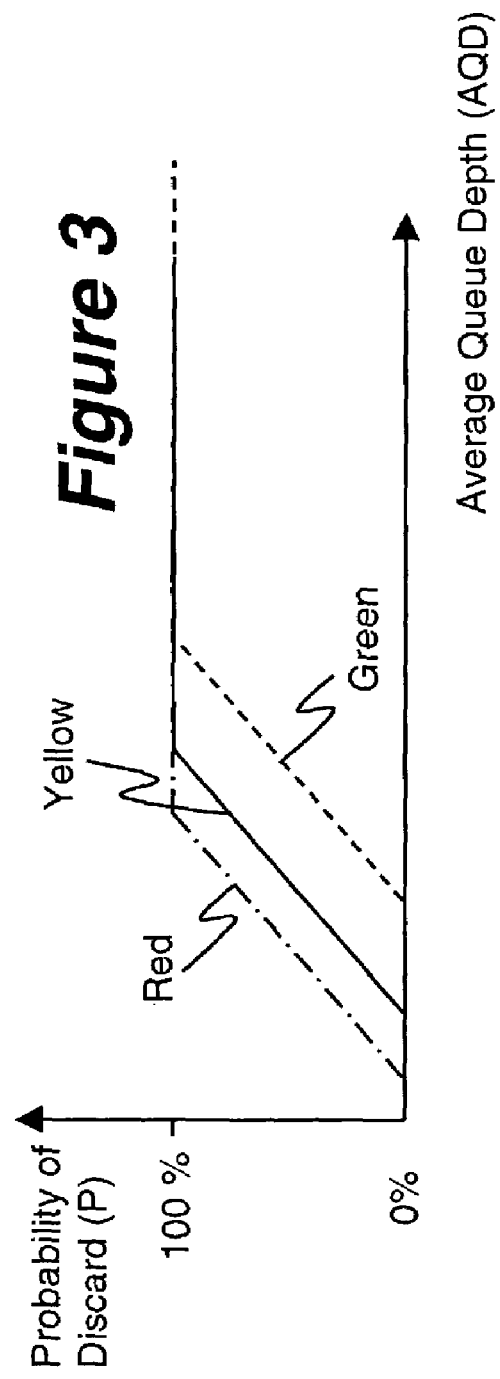
FIG. 3 shows graphs of example discard probability functions for another discard procedure known as weighted RED.
Figure 4:
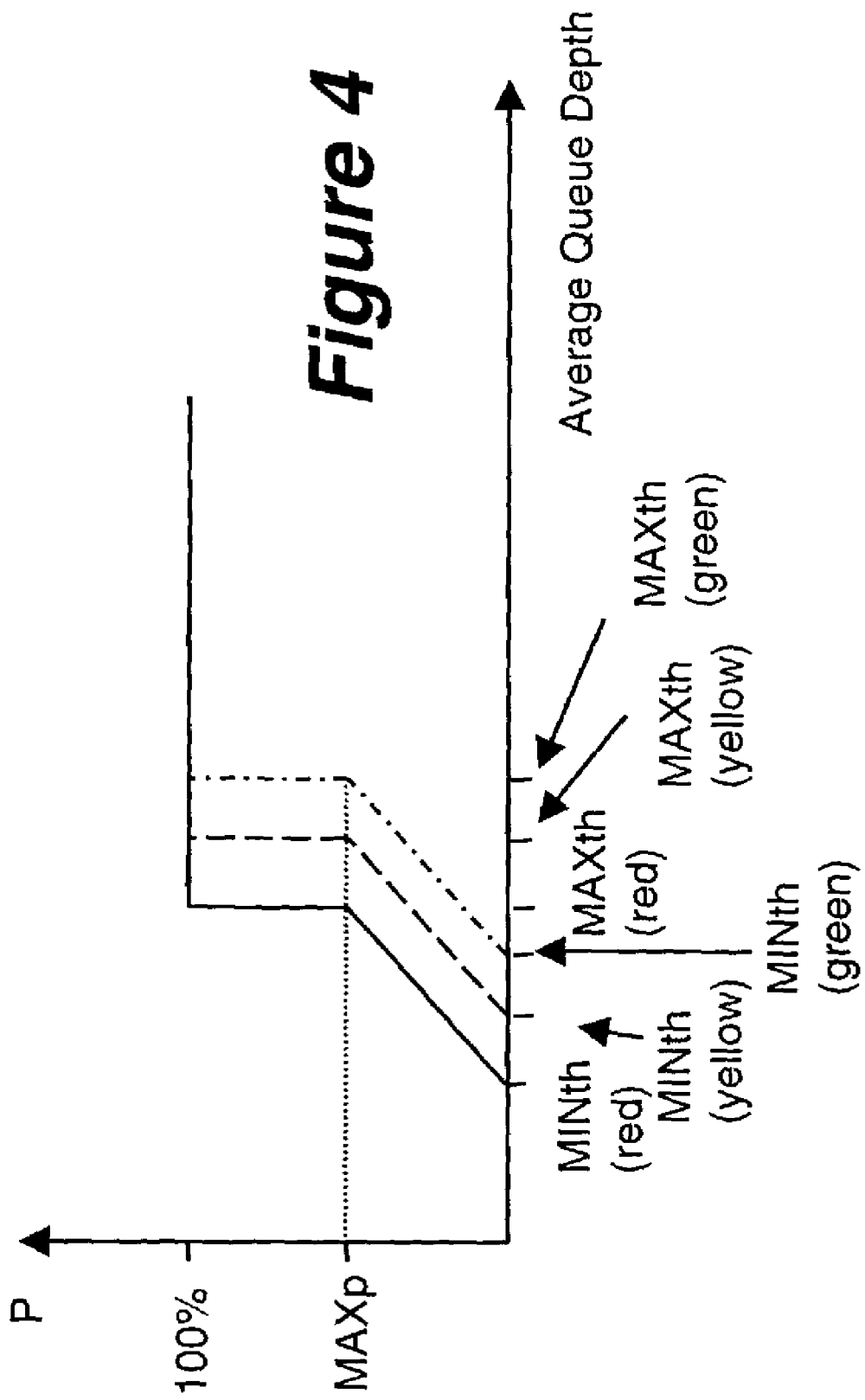
FIG. 4 shows a graph of a discard probability function having a shape that is generally accepted to work well.
Figure 5:
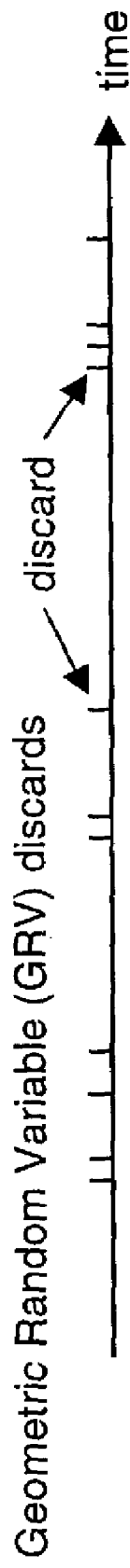
FIGS. 5 and 6 show the results of the GRV (geometric random variable) and URV (uniform random variable) methods with a constant average queue depth.
Figure 6:
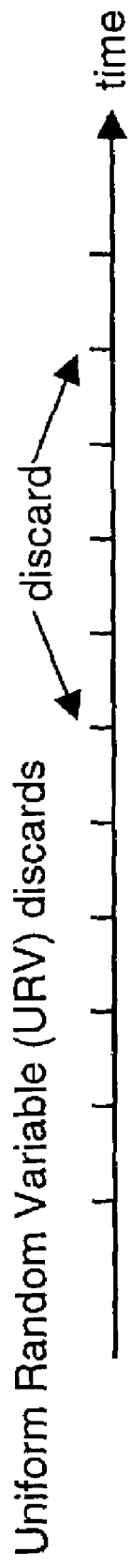

In accordance with a further embodiment when the discard probability function is that shown in FIG. 4, the discard probability, P for each colour, can be expressed as below:

$$P(colour) = MAXp\{New\ N_{avg}(colour) - MINth(colour)\} / \{MAXth(colour) - MINth(colour)\} \quad (4)$$

The invention provides a more efficient technique of performing weighted random early discard (RED) of packets, thereby enabling such actions to be performed on OC192 rate connections. The improved technique provides a distribution of packet discards that is uniformly distributed over time. This type is desirable because it is less likely to effect any one connection, especially so in the case of TCP connections.

The invention also provides a more accurate technique of calculating the average queue depth for periods of idle time, thereby preventing unnecessary discards that could otherwise result, as in the case of the prior art method.

The capability of alleviating traffic congestion in a switch is necessary in order to guarantee service quality to customers of a network. It is desirable to alleviate the congestion by discarding packets of traffic in a manner such that any particular connection on a congested port of the switch is not unduly affected. The invention provides this capability in a manner that is more processing efficient than prior art methods (e.g., weighted RED). This efficiency enables the invention to be performed on OC192 rate connections, which is not possible with prior art methods executed with currently available processors. Therefore, the invention has immediate commercial value for OC192 applications because it provides a capability that is not currently available. Furthermore, due to its higher processing efficiency, the invention should continue to be valuable to our competitors as data rates increase.

What is claimed as an invention is:

1. A method of controlling a queue of a communications system, comprising:
    detecting a color of a packet arriving at the queue, each color corresponding to a different drop precedence level;
    deciding an accept/discard operation on a packet arriving at the queue, based on comparison between a discard probability sum for packets having the detected color and a random variable;
    calculating a discard probability for the packet, using an average depth of the queue;
    generating a new discard probability sum for a next packet arriving at the queue, by summing the discard probability sum and the calculated discard probability;
    accepting a packet arriving at the queue when a discard probability sum for the packet is smaller than or equal to the random variable;
    discarding the packet arriving at the queue when the discard probability sum for the packet is larger than the random variable;
    setting the discard probability sum to zero;
    generating another random variable to replace the aforementioned random variable;
    measuring a current queue depth, $N_{cur}$;
    retaining a previous average queue depth, Previous $N_{avg}$;
    monitoring whether the queue is empty; and
    updating an average queue depth, New $N_{avg}$ by using these formulae:
        when the queue is not empty, New $N_{avg}$=Previous $N_{avg}$+$W \times (N_{cur}-$Previous $N_{avg})$,
        when the queue is empty and New $N_{avg} \neq$Previous $N_{avg}$, New $N_{avg}$=Previous $N_{avg} \times$function (idle time, W), and
        when the queue is empty and New $N_{avg=Previous\ Navg}$, New $N_{avg}$=Previous $N_{avg}+W \times N_{cur}-$Previous $N_{avg})$,
    where W is a running weight.

2. A method of controlling a queue of a communications system, comprising:
    deciding an accept/discard operation on a packet arriving at the queue, based on comparison between a discard probability sum for the packet, having one color detected from a plurality of colors, each color corresponding to a different drop precedence level and a random variable;
    calculating a discard probability for the packet, using an average depth of the queue;
    generating a new discard probability sum for a next packet arriving at the queue, by summing the discard probability sum and the calculated discard probability;
    accepting a packet arriving at the queue when a discard probability sum for the packet is smaller than or equal to a random variable;
    measuring a current queue depth, $N_{cur}$;
    retaining a previous average queue depth, Previous $N_{avg}$;
    monitoring whether the queue is empty; and
    updating an average queue depth, New $N_{avg}$ by using these formulae:
        when the queue is not empty, and $N_{avg}$=Previous $N_{avg}$+$W \times (N_{cur}-$Previous $N_{avg})$,
        when the queue is empty and New $N_{avg} \neq$Previous $N_{avg}$, New $N_{avg}$=Previous $N_{avg} \times$function (idle time, W), and
        when the queue is empty and New $N_{avg}$=Previous $N_{avg}$, New $N_{avg}$=Previous $N_{avg}+W \times (N_{cur}-$Previous $N_{avg})$,
    where W is a running weight.

3. The method according to claim 2, further comprising:
    calculating the discard probability for a newly arrived packet based on a calculated average depth of the queue.

4. A method of controlling a queue of a communications system, comprising:
    deciding an accept/discard operation on a packet arriving at the queue, based on comparison between a discard probability sum for the packet and a random variable;
    calculating a discard probability for the packet, using an average depth of the queue;
    generating a new discard probability sum for a next packet arriving at the queue, by summing the discard probability sum and the calculated discard probability;
    accepting a packet arriving at the queue when a discard probability sum for the packet is smaller than or equal to a first random variable;
    discarding the packet arriving at the queue when the discard probability sum for the packet is larger than the first random variable;
    setting the discard probability sum to zero; and
    generating a second random variable to replace the first random variable, wherein the packet has a drop precedence of a plurality of levels expressed in colors and each color has its discard probability and discard probability sum, the method further comprising:
checking the color of the packet arriving at the queue; and
accepting or discarding the packet based on discard probability sum for the color;
measuring a current queue depth, $N_{cur}$;
retaining a previous average queue depth, Previous $N_{avg}$;
monitoring whether the queue is empty; and
updating an average queue depth, New $N_{avg}$ by using these formulae:
when the queue is not empty, New $N_{avg}$=Previous $N_{avg}$+ W×($N_{cur}$−Previous $N_{avg}$),
when the queue is empty and New $N_{avg}$≠Previous $N_{avg}$, New $N_{avg}$=Previous $N_{avg}$×function (idle time, W), and
when the queue is empty and New $N_{avg}$=Previous $N_{avg}$, New $N_{avg}$=Previous $N_{avg}$+W×($N_{cur}$−Previous $N_{avg}$),
where W is a running weight.

5. The method according to claim 4, further comprising:
calculating a discard probability for the color, using an average depth of the queue, and
generating a new discard probability sum for a next packet of the color arriving at the queue, by summing the discard probability sum and the calculated discard probability for the color.

6. In performing a random early packet discard procedure in a telecommunications system, a method of calculating an average depth of a queue when a packet arrives thereat, comprising:
measuring a current queue depth, $N_{cur}$;
retaining a previous average queue depth, Previous $N_{avg}$;
monitoring whether the queue is empty; and
updating an average queue depth, New $N_{avg}$, by the following formulae;
when the queue is not empty,
New $N_{avg}$=Previous $N_{avg}$+W×($N_{cur}$−Previous $N_{avg}$);
when the queue is empty and New $N_{avg}$≠Previous $N_{avg}$,
New $N_{avg}$=Previous $N_{avg}$×function (idle time, W); and
when the queue is empty and also New $N_{avg}$=Previous $N_{avg}$;
New $N_{avg}$=Previous $N_{avg}$+W×($N_{cur}$−Previous $N_{avg}$);
where W is a running weight and the function returns values based on an idle time of the queue and W.

7. The method according to claim 6, wherein W is $\frac{1}{2}^M$ and M is an integer between 0 and 15.

8. The method of claim 6, further comprising:
deciding an accept/discard operation on a packet arriving at the queue, based on comparison between a discard probability sum for the packet and a random variable;
calculating a discard probability for the packet, using an average depth of the queue; and
generating a new discard probability sum for a next packet arriving at the queue, by summing the discard probability sum and the calculated discard probability.

9. The method according to claim 8, further comprising:
accepting each packet arriving at the queue when a discard probability sum for the packet is smaller than or equal to a random variable;
discarding a most recent packet arriving at the queue, when the discard probability sum for the most recent packet is larger than the random variable;
setting the discard probability sum to zero;
generating another random variable to replace the aforementioned random variable; and
deciding an accept/discard operation on further packets arriving at the queue.

10. The method according to claim 9, wherein packets arriving at the queue have a drop precedence of a plurality of levels expressed in colors and each color has its discard probability and discard probability sum, the method further comprising:
checking the color of each packet arriving at the queue; and
accepting or discarding the packet based on discard probability sum for the color.

11. A mechanism for controlling a queue of a communications system comprising:
a receiver for receiving and sending a packet to a queue for storage;
a discard probability calculation module that calculates a discard probability sum which is a summation of discard probabilities of all packets that have arrived at the queue since a packet was last discarded from the queue;
a random number generator that generates a random number when instructed;
a discard module that discards a just arrived packet from the queue when the discard probability sum is greater than the generated random number, and instructs the discard probability calculation module to set the discard probability sum to zero and to generate another random number to replace the generated random number; and
a processor for obtaining an average depth of the queue by using these equations:
when the queue is not empty, New $N_{avg}$=Previous $N_{avg}$+ W×$N_{cur}$−Previous $N_{avg}$),
when the queue is empty and New $N_{avg}$≠Previous $N_{avg}$, New $N_{avg}$=Previous $N_{avg}$×function (idle time, W), and
when the queue is empty and New $N_{avg}$=Previous $N_{avg}$, New $N_{avg}$=Previous $N_{avg}$+W×($N_{cur}$−Previous $N_{avg}$),
where $N_{cur}$ is a current queue depth, Previous $N_{avg}$ is a previous average queue depth, New $N_{avg}$ is a new average queue depth, W is a running weight, and the function returns values based on an idle time of the queue and W.

12. The mechanism according to claim 11, further comprising:
a sum operator that produces a new discard probability sum by adding a newly calculated discard probability for the just arrived packet to a previous discard probability sum.

13. The mechanism according to claim 12, wherein the receiver further comprises means for checking drop precedence of the just arrived packet.

* * * * *

UNITED STATES PATENT AND TRADEMARK OFFICE
CERTIFICATE OF CORRECTION

PATENT NO. : 7,636,307 B2 Page 1 of 1
APPLICATION NO. : 10/386651
DATED : December 22, 2009
INVENTOR(S) : Mark Thibodeau and Bin Du It is certified that error appears in the above-identified patent and that said Letters Patent is hereby corrected as shown below:

Col. 8, Claim 1, line 14, "New $N_{avg=Previous\ Navg}$" should be "New $N_{avg}$ = Previous $N_{avg}$";

Col. 8, line 15 "+ W x $N_{cur}$" should be "+ W x ($N_{cur}$".

Col. 9, Claim 6, line 35, "monitoring whether the queue is empty" should be "monitoring whether or not the queue is empty";

Col. 9, line 36, "updating an average" should be "updating the average".

Col. 10, Claim 11, line 40, "W x $N_{cur}$" should be "W x ($N_{cur}$".

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,636,307 B2
APPLICATION NO. : 10/386651
DATED : December 22, 2009
INVENTOR(S) : Thibodeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1913 days.

Signed and Sealed this

Twenty-first Day of December, 2010

David J. Kappos
*Director of the United States Patent and Trademark Office*